(12) United States Patent
Levin et al.

(10) Patent No.: US 11,991,025 B2
(45) Date of Patent: May 21, 2024

(54) TRANSCEIVER PARAMETER DETERMINATION

(71) Applicant: Intel Corporation, Santa Clara, CA (US)

(72) Inventors: Itamar Levin, Holon (IL); Tali Warshavsky, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 17/110,228

(22) Filed: Dec. 2, 2020

(65) Prior Publication Data

US 2021/0119835 A1 Apr. 22, 2021

Related U.S. Application Data

(60) Provisional application No. 62/943,659, filed on Dec. 4, 2019.

(51) Int. Cl.
*H04L 25/03* (2006.01)
*G06F 13/42* (2006.01)

(52) U.S. Cl.
CPC .... *H04L 25/03019* (2013.01); *G06F 13/4282* (2013.01); *H04L 2025/03636* (2013.01)

(58) Field of Classification Search
CPC .. H04B 7/005; H04B 10/616; H04B 10/6165; H04B 1/707; H04B 2201/70701; H04B 3/23; H04B 1/7097; H04B 10/6162; H04L 25/03057; H04L 25/03038; H04L 25/03019; H04L 2025/03617; H04L 25/03885; H04L 2025/0349; H04L 27/01; H04J 3/0697; H04J 14/02; H04J 3/0685; H04J 3/047; H04J 3/0682; H04J 3/1652; H04J 14/0282; H04J 3/0667; H04J 3/0658; H04W 88/085; H04W 56/00; H04W 56/0015; H04W 56/001; H04W 88/08;

(Continued)

(56) References Cited

U.S. PATENT DOCUMENTS 9,325,546 B1 * 4/2016 Mobin .............. H04L 25/03878
9,565,037 B1 * 2/2017 Liu .................... H04L 25/03057
10,742,453 B1 * 8/2020 Wu .................... H04L 25/03057

(Continued)

OTHER PUBLICATIONS

Balan, Vishnu, et al., "A 4.8 6.4-GB/s Serial Link for Backplane Applications Using Decision Feedback Equalization", IEEE Journal of Solid-State Circuits, vol. 40, No. 9, Sep. 2005, 11 pages.

(Continued)

*Primary Examiner* — Eva Y Puente
(74) *Attorney, Agent, or Firm* — Compass IP Law PC

(57) ABSTRACT

Examples described herein include setting an equalizer tap setting and gain setting in a serializer/deserializer (SerDes). In some examples, determining an equalizer setting and gain setting occurs by causing a mean-square error cost scheme tracking to lock to an offset from a minimum of a cost of the mean-square error cost scheme without pausing error cost tracking. In some examples, the mean-square error cost scheme comprises a least mean square (LMS) scheme. In some examples, determining an equalizer setting comprises: applying increases or decreases to an equalizer setting, and an increase to an equalizer setting can be a different amount than an amount of decrease to an equalizer setting.

17 Claims, 13 Drawing Sheets

(58) Field of Classification Search
CPC .. H04W 92/12; H04W 56/0055; H04W 4/023
USPC ......................................................... 375/232
See application file for complete search history.

(56) References Cited

U.S. PATENT DOCUMENTS

2016/0065394 A1* 3/2016 Sindalovsky ..... H04L 25/03012
375/371
2019/0386773 A1* 12/2019 Nir ........................ H04L 1/0045

OTHER PUBLICATIONS

Song, Shiming, et al., "System Level Optimization for High-Speed SerDes: Background and the Road Towards Machine Learning Assisted Design Frameworks", MDPI electronics, Published: Oct. 28, 2019, 15 pages.
Telang, Vivek, "Equalization for High-Speed Serdes: System-level Comparison of Analog and Digital Techniques", Broadcom Corporation, Aug. 10, 2012, 67 pages.

* cited by examiner

TRANSCEIVER PARAMETER DETERMINATION

RELATED APPLICATION

The present application claims the benefit of priority date of U.S. provisional patent application Ser. No. 62/943,659, filed Dec. 4, 2019, the entire disclosure of which is incorporated herein by reference.

DESCRIPTION

In data communications systems, serial communication between a transmitter and a receiver utilizes equalization to mitigate frequency dependent signal attenuation. Equalization can be applied at the transmitter (Tx) and/or at the receiver (Rx). Typically, a combination of transmitter and receiver equalization is used.

DETAILED DESCRIPTION

Figure 1A:
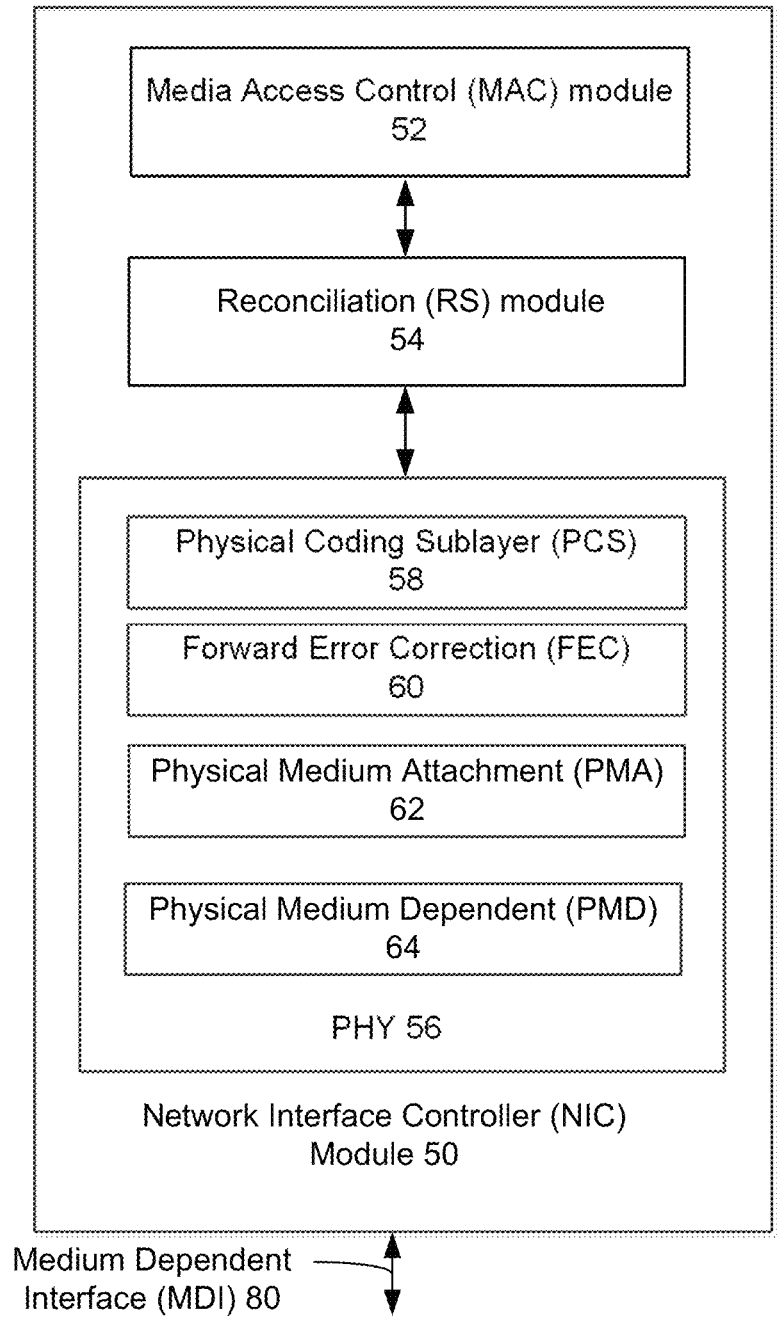
FIG. 1A is a block diagram.

Link training is a process used by a device connected through a copper cable, backplane, fibre backplane, or other wired or wireless signal transmission media by which a transmitter and receiver, coupled using a high-speed serial link, communicate with each other in order to tune their equalization settings. For example, transmitter and receiver devices can adjust settings of serializer/deserializer (SerDes) devices during link training. Link training enables tuning of the finite impulse response (FIR) filter for each channel in an application-specific integrated circuit (ASIC) or other device to achieve a desired bit error rate (BER), signal-to-noise ratio (SNR), eye size, or link errors (e.g., uncorrectable and correctable FEC errors, pseudorandom bit sequence (PRBS) errors, physical coding sublayer (PCS) errors).

In some examples, the receiver examines the eye after applying equalization to the signal path and determines if eye height and/or eye width is acceptable. The receiver can make a decision to terminate link training because the eye is acceptable, or keep training to optimize the eye further. If the receiver requests that its link partner transmitter change precursor, main cursor or post-cursor equalization setting, the eye examination process can begin again. As a link partners both include a transmitter and receiver, a link partner can simultaneously train the other partner's transmitter. After the link is trained, the two devices begin sending normal data traffic using the optimized transmitter settings. In some examples, a receiver optimizes the SNR at its output or minimizes the inter symbol interference (ISI) at its output.

In some known examples, SerDes receivers can use continuous time linear equalizers (CTLEs) and/or decision feedback equalizers (DFEs) that automatically adapt to channels with a wide range of insertion loss. Coefficients of feed forward equalizers (FFE) can be determined to reduce signal error.

Least Mean Square (LMS) adaptation schemes, and variants (e.g., Sign-Error LMS and Sign-Sign LMS) are adaptive control schemes that attempt to minimize the mean-square error of a cost function, by tuning a controlled parameter(s). LMS can be used for parameter estimation, equalization, system identification and more. In some examples, LMS is used to determine coefficients of equalizers used by a SerDes. For example, LMS can be used to determine coefficients for CTLE, FFE and DFE or other equalizers.

An example use of a links is in optical-to-electrical module coupling. An optical module is a hot-pluggable optical transceiver that is used in high-bandwidth data communications applications. The optical module typically can include an electrical connection to a chip (for example, a host application specific integrated circuit (ASIC)). This electrical connection can operate at a high data rate serial link (referred to as xGAUI-n where AUI stands for Attachment Unit Interface, x is the data rate per lane in Giga bits per second (Gbps), and n is the number of lanes), with current rates of 50 Gb/s per lane (50GAUI-1). 50GAUI-1is a one lane serial link used for chip-to-chip or chip-to-module interconnections. However, an optical module is merely one example of a device that uses a serial link. Any electrical signal transmitter or receiver can also use a serial link.

The Ethernet (IEEE 802.3) standards for 10 Gb/s and above over backplane and copper cables include a PMD (Physical Media Dependent) control function that enables adjusting the transmitter equalization settings as part of the link training. The PMD control function uses a handshake-based protocol for requesting coefficient changes. The protocol is described by state diagrams (e.g., FIGS. 72-4, 72-5 and 72-6 in IEEE Std 802.3-2012 and variations thereof). These figures are referenced in approved and draft standards for multiple PMDs (e.g., 10GBASE-KR, 40GBASE-KR4, 40GBASE-CR4, and 100GBASE-CR10). Link training is applicable to other wired communications or networking systems such as but not limited to FibreChannel, InfiniBand, or Serial Attached Small Computer System Interface (SAS). Extending link training time can be useful for 4-level pulse amplitude modulation (PAM) links (e.g., PAM4 links), PAM4, PAM5, PAM6, n-level PAM links (where n is an integer), non-return-to-zero (NRZ) line code, and so forth.

For example, link training can be applied by a base station that supports communications using wired or wireless protocols (e.g., 3GPP Long Term Evolution (LTE) (4G) or 3GPP 5G), on-premises data centers, off-premises data centers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

FIG. 1A is a block diagram illustrating Ethernet port circuitry in a network interface controller 50. The Ethernet port logic includes a Media Access Control (MAC) module 52, a reconciliation sublayer module 54 and a PHY module 56. The PHY module 56 can include a physical medium attachment (PMA) sublayer module 62, Physical Medium Dependent (PMD) sublayer 64, a forward error correction (FEC) module 60 and a physical coding sublayer (PCS) module 58.

MAC module 52 is configured to transfer data to and from the PHY module 56. The Reconciliation Sublayer (RS) module 54 can provide a mapping operation that reconciles the signals at a Media Independent Interface (MII) to the Media Access Control (MAC)-Physical Signaling Sublayer (PLS) service definitions. MAC module 52 can be configured to implement aspects of the MAC layer operations and the RS module 54 can be configured to implement reconciliation sublayer operations.

Physical Medium Dependent (PMD) sublayer 64 can be responsible for interfacing to transmission medium, Medium Dependent Interface (MDI) 80. Various embodiments of PMD sublayer 64 can perform link establishment, link training or link re-training in accordance with embodiments described herein. The Physical Medium Attachment (PMA) sublayer 62 can perform transmission, reception, signal detection, clock recovery and skew alignment. PMD 64 and PMA 62 can be configured to transmit and receive serial data over the MDI 80.

In some examples, PMD 64 and PMA 62 can include or use a serializer de-serializer (SerDes). In some examples, link training and re-training can be performed by PMD 64 and/or PMA 62 to adjust filter parameters of a transmit and/or receive equalizer used by a SerDes. For example, a software SerDes driver executed by a processor in a host or a network interface can be used to change a transmit equalizer parameter. In some examples, any combination of hardware, software and/or firmware can be used to manage and perform link training and/or link re-training.

In some examples (e.g., for 100GBASE-CR1 or 100GBASE-KR1), FEC module 60 may decode data passed from the PMD 64 and PMA 62 to the PCS module 58 or encode data passed from the PCS module 58 to the PMD 64 and PMA 62a, 62b. In some examples, (e.g., for 200G and 400G modes), PCS module 58 includes FEC module 60. Forward error correction code may improve the reliability of data transmission at higher line speeds.

In a transmit direction, MAC module 52 can receive data to be transmitted in a media access control (MAC) frame over MDI 80, and generates the MAC frame that includes inter-packet gap (IPG), preamble, start of frame delimiter (SFD), padding, and Cyclic Redundancy Check (CRC) bits in addition to the received data before passing the MAC frame to the PHY module 56. The PHY module 56 can encode the MAC frame for reliable serial transmission over the MDI 80.

In a receive direction, MAC module 52 can receive MAC frames over a data bus from PHY module 56. MAC module 52 can accept MAC frames from PHY 56, perform Ethernet frame detection and validation, cyclic redundancy check (CRC) validation, update statistics counters, strip out the CRC, preamble detection and removal, and start of frame delimiter (SFD) detection and removal, and forward the rest of the MAC frame that includes headers for other protocols to a next layer (for example, an Internet protocol (IP) layer) for processing.

Figure 1B:
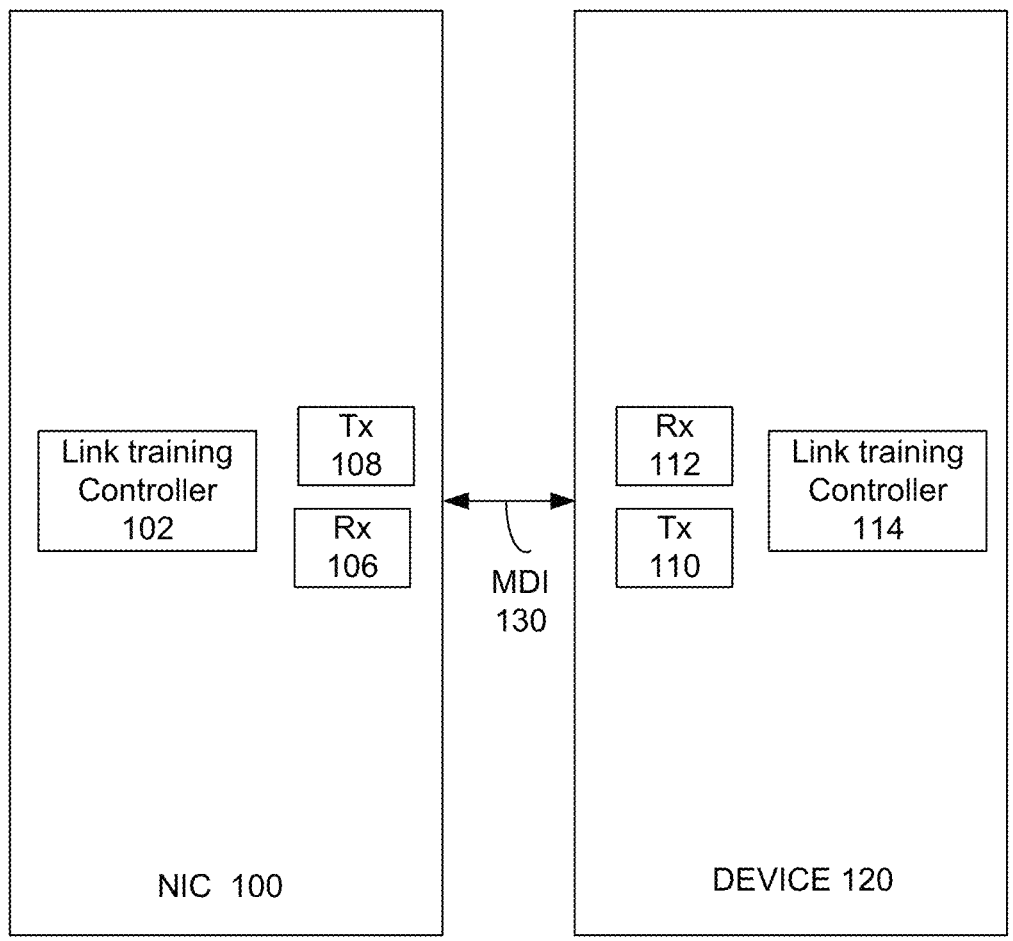
FIG. 1B illustrates a simplified example of a transmitter-receiver pair.

FIG. 1B illustrates a simplified example of a transmitter-receiver pair between a network interface controller 100 and a device 120. MDI 130 provides a link between network interface controller 100 and device 120 by transferring data in parallel over one or more lanes. Device 120 can be any device such as another NIC, a switch, router, a server, a host computing platform, and so forth.

Network interface controller 100 can include a host receiver 106 and a host transmitter 108 for at least one lane of an electrical link between the network interface controller 100 and device 120. Device 120 can include a module receiver 112 and module transmitter 110 for an electrical link between network interface controller 100 and device 120.

For example, link training controller 102 of NIC 100 can initiate or manage link establishment, link training, or link re-training operations as described herein using an offset from a local minimum to determine equalizer settings. Link training controller 102 can be implemented as any or a combination of: a driver, microcontroller, or other software in a host or network interface. For example, link training controller 102 can use an LMS operation with skewed offset to determine tap coefficients.

Transmitter (Tx) 108/110 or receiver (Rx) 106/112 can use a SerDes to serialize or deserialize a signal. When a SerDes is turned on and a signal is received, Rx tuning can be used to improve the signal quality. When there is a time limit to perform Rx tuning, a signal is to be passed to a PCS layer within the time limit and the link comes-up if the link is acceptable. If the link does not pass, training can be restarted. In some examples, Tx 108-Rx 112 and/or Tx 110-Rx 106 can utilize independent Rx tuning. In some embodiments, an amount of time to perform equalizer tuning is the same for Tx 108-Rx 112 and Tx 110-Rx 106.

When auto-negotiation is used to establish link between two Ethernet ports an IEEE defined procedure is followed. First, a "base page" exchange can be performed to determine common capabilities and select an operating mode (e.g., link speed (e.g., 1000BASE-KX, 10GBASE-KX4 . . . 100GBASE-CR4 and so forth), FEC mode, pause capability, and so forth). Next, an arbitrary length next page exchange phase can occur. Next page exchange can be used, for example, to advertise IEEE capabilities as well as non-IEEE capabilities such as the Ethernet Consortium modes. At the end of next page exchange, the selected operating mode can be configured and a link-training phase can begin. During this link training phase, changes in the peer transmit (e.g., Tx 108 or Tx 110) equalization settings and monitoring the effect on link quality at the receiver (e.g., Rx 106 or Rx 112) and adjusting equalization settings to optimize the link can occur.

According to some embodiments, when link training controller 102 or 114 performs training at least of receiver equalizer settings to accommodate at least for channel impairments (e.g., arising out of signal transfer over backplane or conductive cable). Various embodiments of link training controllers 102 and 114 can determine equalizer settings during link training or re-training as described herein using an offset from a local minimum to determine equalizer settings. For example, link training controllers 102 and/or 114 can use an LMS operation with skewed offset to determine tap coefficients. Link training controllers 102 and 114 can be implemented as a driver, microcontroller, or other software in a host or network interface.

Communications between devices can occur using any protocol. For example, Ethernet frames can be sent by NIC 100 to device 120. For example, Ethernet frames can be sent by device 120 to NIC 100. An Ethernet frame can include one or more of: a preamble, start of frame delimiter (SFD), destination MAC address, source MAC address, EtherType field, length field, frame check sequence (e.g., cyclic redundancy check (CRC)), and payload.

Figure 1C:
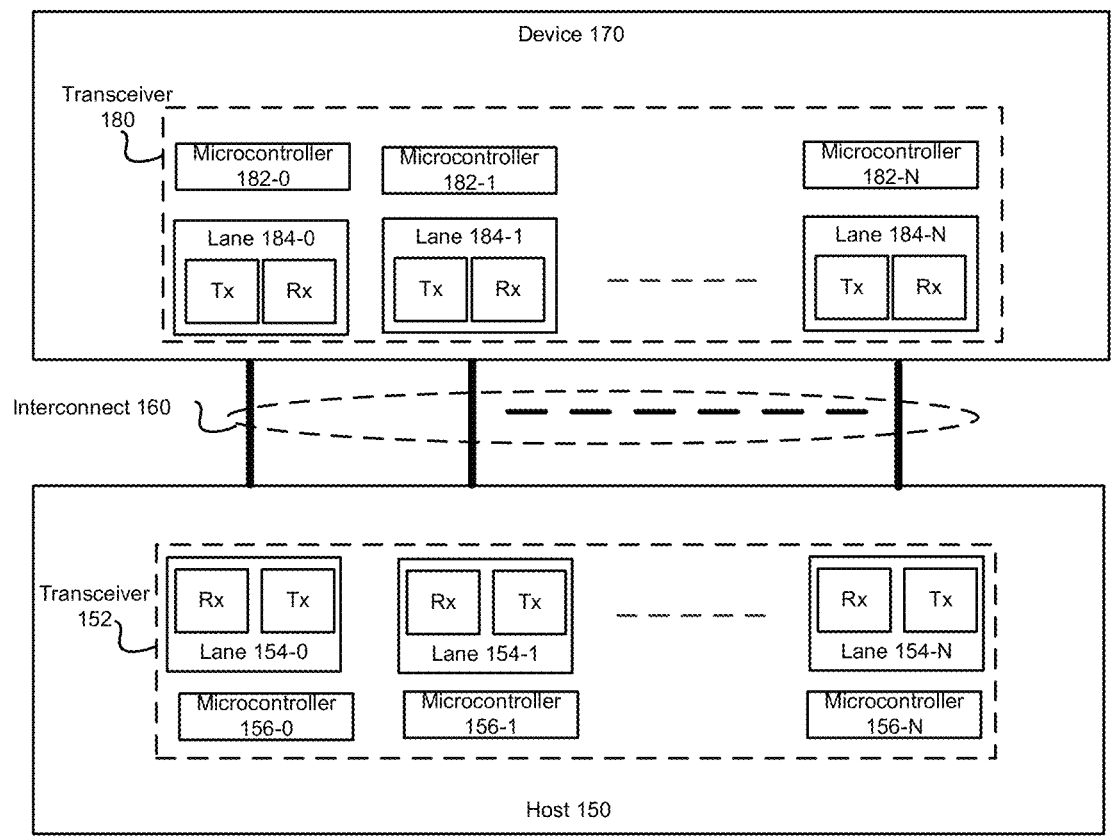
FIG. 1C depicts an example system for communicatively coupling a network device to another network device.

FIG. 1C depicts an example system for communicatively coupling a network device to another network device. For example, host 150 and device 170 can include a network device such as one or more of: a network interface, switch, router, server, host computing platform, interconnect, fabric, rack, or any computing or communications device. For example, device 170 can be connected to an interface with multiple electrical links (e.g., backplane or copper cable). The system provides for multiple lanes of transmit-receive pairs that can be used to transmit or receive electrical signals between host 150 and device 170. A lane can transmit and/or receive a signal. A transmitter of a lane can use an equalizer implemented in an analog circuit to generate an electrical signal for transmission. The equalizer can have one or more current sources that are used to create a signal whereby weights of current sources can be adjusted to change signal characteristics. Equalizer settings can be modified to change weights of current sources. For example, a digital-to-analog converter (DAC) can be used to create signal in the digital domain and output the result in an analog format.

Various embodiments use any of microcontrollers 182-0 to 182-N of device 170 to initiate and manage link training of transmitter and/or receiver equalizer settings with any of microcontrollers 156-0 to 156-N of host 150. Various embodiments of microcontrollers 182-0 to 182-N can perform link establishment, link training or link re-training and use an LMS operation with skewed offset to determine tap coefficients. Similarly, various embodiments of microcontrollers 156-0 to 156-N can perform link establishment, link training or link re-training and use an LMS operation with skewed offset to determine tap coefficients.

Transceiver 180 can be used for electrical signal transmission and receipt between device 170 and host network interface device 150. Transceiver 180 can provide multiple transmit and receive lanes for electrical signal communication between device 170 and host device 150. For example, lanes 184-0 to 184-N can provide transmit and receive circuitry for coupling with receive and transmit circuitry of lanes 154-0 to 154-N of host device 150. Lanes 184-0 to 184-N can provide serializer/deserializer (SerDes) formatting of signals. In some examples, transceiver 180 can be part of a PMD or PHY.

Device 170 can be communicatively coupled to host device 150 by an interconnect 160. Interconnect 160 can be electrical signal conductors that couple pins or holes of lanes 184-0 to 184-N of a pluggable device 170 to holes or pins of lanes 154-0 to 154-N of host 150. Host network interface device 150 can transmit or receive signals in electrical format to or from device 170.

Host device 150 can include transceiver 152 for communication with device 170. Transceiver 152 can include lanes 154-0 to 154-N where any of lanes 154-0 to 154-N includes receive and transmit circuitry. In some examples, transceiver 152 can be part of a PMD or PHY. Any microcontroller 156-0 to 156-N can be used to manage operation of its lane.

In some embodiments, a single microcontroller can manage equalizer settings of one or multiple lanes. The one or more parameters can cause a receiver or transmitter device in any of lanes 154-0 to 154-N to adjust its equalizer setting for a specific tap, whether to increase or decrease the coefficient value of an equalizer tap. In some embodiments, the settings of a tap can be adjusted independent of adjustment of settings of another tap.

For example, to initiate an equalizer setting change, any microcontroller 182-0 to 182-N can determine a signal quality of a received signal and determine what transmitter side tap to change and whether to increment or decrement the setting of the tap. For example, an eye opening of a received signal can be measured. An eye can represent 1 to 0 and 0 to 1 transitions of a signal and indicate whether the transitions occur within isolated time regions. A microcontroller can estimate inter-symbol interference (ISI) and select settings based on an ISI reaching a minimum value or estimate the noise at the receiver output and try to minimize noise. A microcontroller can search through available transmitter tap settings and select settings that lead to a most open eye. Transmitter equalizer settings can be changed periodically starting at or after link startup In some examples, host 150 can request to change an equalizer setting of any tap of a transmitter equalizer circuit of device 170. Likewise, device 170 can request to change an equalizer setting of any tap of a transmitter equalizer circuit of host 150. Accordingly, device 170 and host 150 can adjust transmitter equalizer settings used by a partner device. Moreover, any of device 170 and host 150 can adjust receiver equalizer settings to compensate for channel distortions.

For example, to initiate an equalizer setting change, any microcontroller 182-0 to 182-N can determine a signal quality of a received signal and determine what transmitter side tap of host device 150 to change and whether to increment or decrement the setting of the tap. For example, an eye opening of a received signal can be measured. An eye can represent 1-to-0 and 0-to-1 transitions of a signal and indicate whether the transitions occur within isolated time regions. A microcontroller can estimate inter-symbol interference (ISI) and select settings based on an ISI reaching a minimum value. A microcontroller can search through available transmitter tap settings and select settings that lead to a most open eye. Transmitter equalizer settings can be changed periodically starting at or after link startup and can run periodically. Similar operations can occur for microcontroller 156-0 to 156-N to adjust transmit equalizer settings of device 170.

Any of device 170 or host 150 can perform packet processing such as one or more of: media access control, any protocol layer processing, security, routing, destination lookup, and so forth.

Modules can be built using a standard mechanical and electrical form factor such as the Small Form-factor Pluggable (SFP), Quad Small Form-factor Pluggable (QSFP), Quad Small Form-factor Pluggable Double Density (QSFP-DD), Micro QSFP, or OSFP (Octal Small Format Pluggable) interfaces, described in Annex 136C of IEEE Std 802.3cd-2018 and references therein, or other form factors. The SerDes can be built into standalone application specific integrated circuits (ASICs) or general purpose computer devices (CPUs) or more specific accelerators, such as Machine Learning accelerator devices, Graphics Processing Units (GPUs) and not just modules.

Various embodiments can be used for any device-to-device connection such as Peripheral Component Interconnect (PCI) Express (e.g., PCI Express Base Specification 1.0 (2002), as well as earlier versions, later versions, and variations thereof), Universal Serial Bus (USB), Thunderbolt, High-Definition Multimedia Interface (HDMI), DisplayPort, USB type C links, or Compute Express Link (CXL) (e.g., Compute Express Link Specification revision 2.0, version 0.7 (2019), as well as earlier versions, later versions, and variations thereof).

Figure 2A:
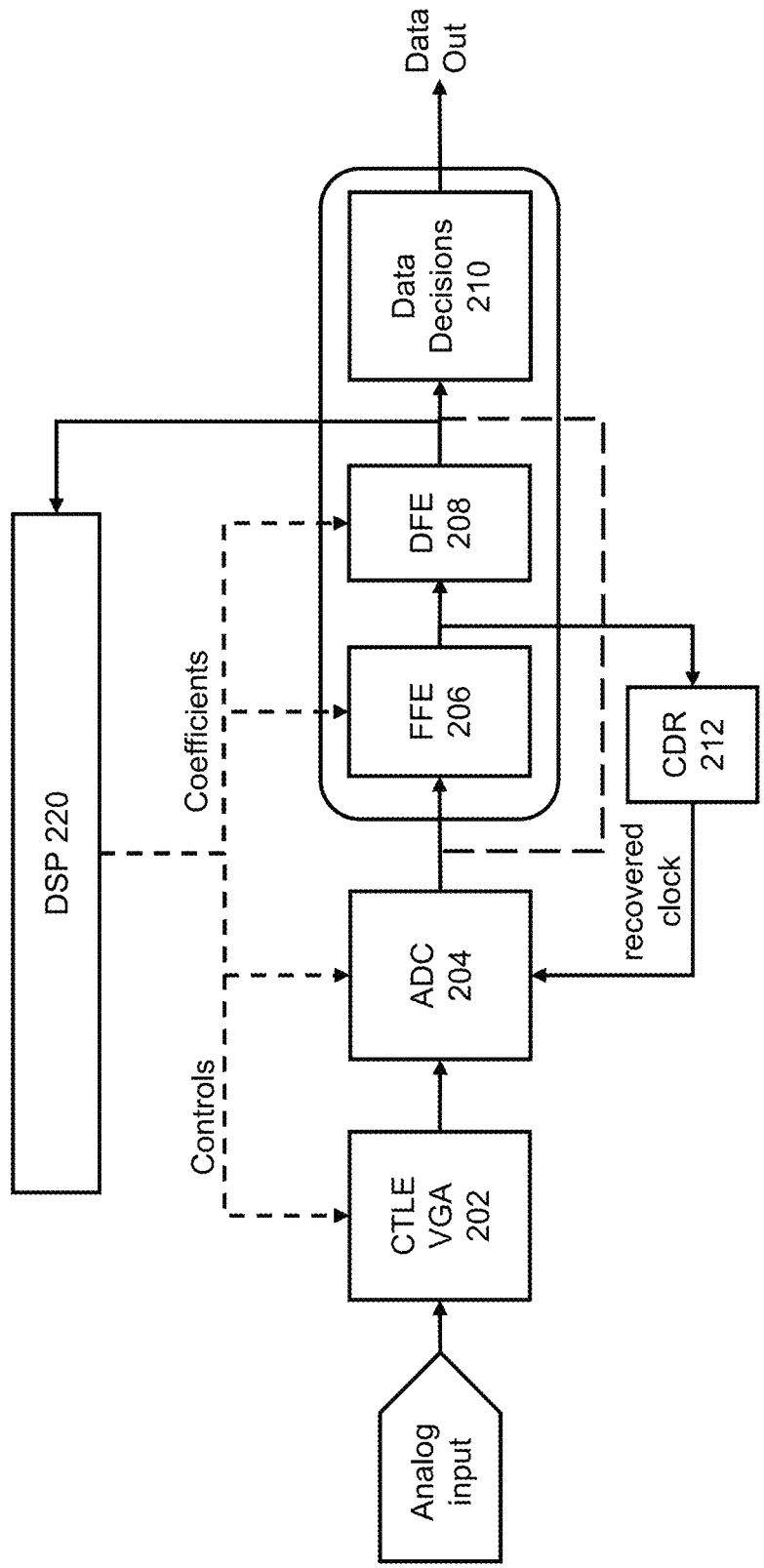
FIG. 2A depicts an example of a system.

FIG. 2A depicts an example of a system that can receive an analog input signal and generate a digital output data signal using equalizers (e.g., CTLE and variable gain amplifier (VGA) 202, FFE 206 and DFE 208), an analog-to-digital converter (ADC) 204, and clock and data recovery (CDR) 212. A digital signal processor (DSP) 220 can tune a gain setting of CTLE and VGA 202 and/or equalizer tap settings of FFE 206 and/or DFE in accordance with various embodiments described herein. For example, DSP 220 can determine a gain setting using LMS with an offset for CTLE VGA 202 and/or determine tap coefficients using LMS with an offset for one or more of a FFE 206 and/or DFE 208. DSP 220 can be implemented as any processor, application specific integrated circuit (ASIC), discrete signal processor, field programmable gate array (FPGA), and so forth. Data decisions 210 can determine data values (e.g., 0 or 1) based on data output from DFE 208.

Figure 2B:
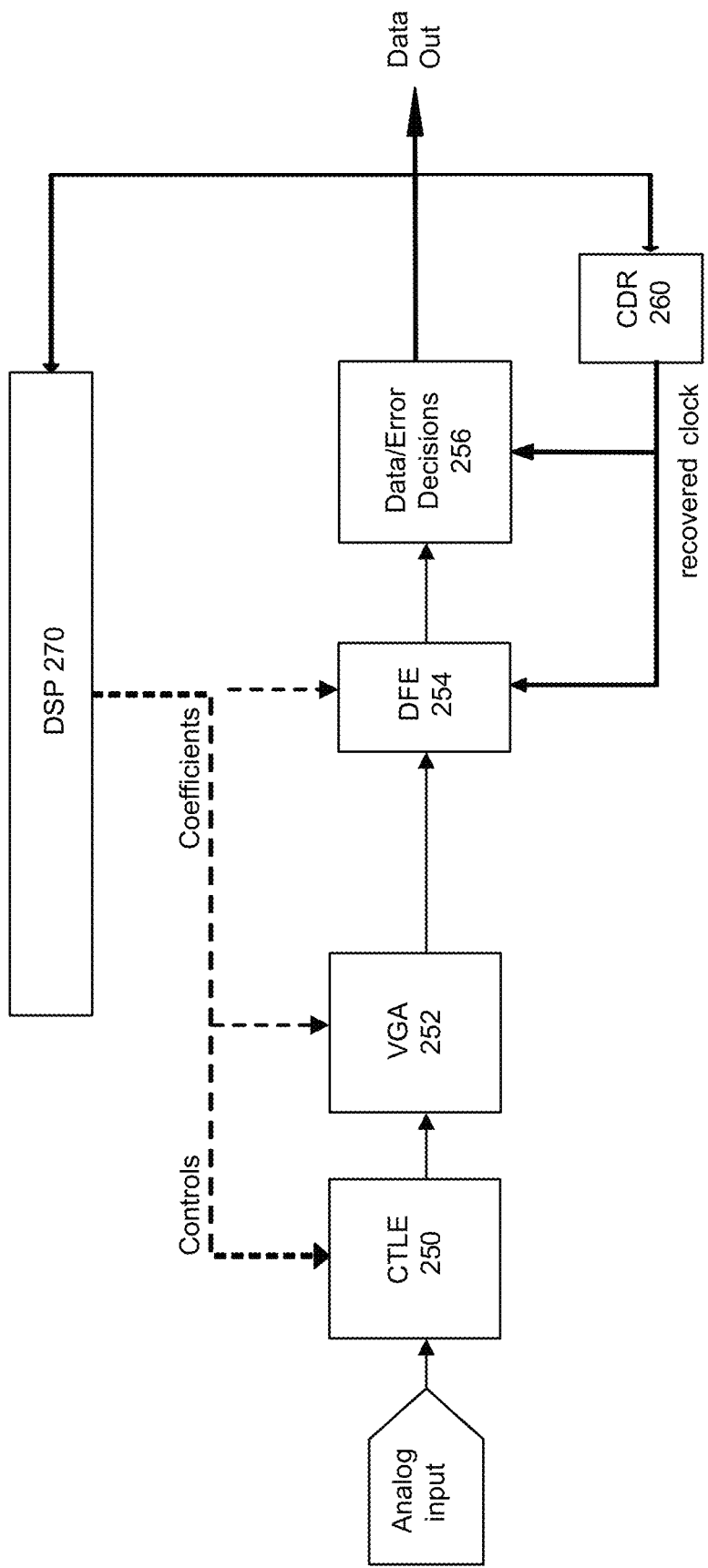
FIG. 2B depicts an example of a system.

FIG. 2B depicts an example of a system that can receive an analog input signal and generate a digital output data signal using equalizers (e.g., CTLE 250 and/or DFE 254), VGA 252, data/error decisions 256, and clock and data recovery (CDR) 260. DSP 270 can tune a gain setting of VGA 252 or equalizer tap settings of DFE 254 in accordance with embodiments described herein. For example, DSP 270 can determine a gain of VGA 252 using LMS with an offset. In some examples, an automatic gain control (AGC) (not shown) can set gain of VGA 252. For example, DSP 270 can determine tap coefficients using LMS with an offset for DFE 254. DSP 270 can be implemented as any processor, application specific integrated circuit (ASIC), discrete signal processor, field programmable gate array (FPGA), and so forth. Data and error decisions 258 can determine data values (e.g., 0 or 1) based on data output from DFE 254.

Various embodiments set receiver equalizer settings or transmitter equalizer settings. In some examples, use of LMS forces error (e.g., $J(k)=\langle\|e(k)\|^2\rangle$) towards zero and coefficients are selected based on an error value of zero. But, in some situations, from an overall system performance considerations, global or system performance metric involving other components may be too high if LMS forces error towards zero. A global or system performance metric can be signal to noise ratio (SNR) at various locations in the receiver (e.g., the ADC output, the FFE or DFE output or prior to a decision making circuit, etc.) or noise power measured or sensed at different locations in the receiver (e.g., the receiver input, the output of the CTLE, the ADC output, the FFE or DFE output or prior to the decision making circuit, etc.). Sometimes when the LMS drives an ISI component to zero, it minimizes the mean square error due to ISI but the overall noise floor may not be at its global minimum and the SNR may not reach its maximum. Accordingly, allowing a feedback loop to maintain some error enables tuning elsewhere in the system as global error may be too high if LMS forces equalizer error towards zero. For example, if multiple equalizers in a receiver system use LMS to converge and track inter-symbol interference (ISI), forcing error to zero may provide too high global error levels (e.g., ISI) or too low SNR due to noise amplification by the equalizers. In accordance with some embodiments, in connection with choosing equalizer settings, DSP 220 or DSP 270 can apply a skewed offset scheme can be used whereby an LMS cost operation is used to select equalizer settings using an offset from a local minimum value.

Figure 3:
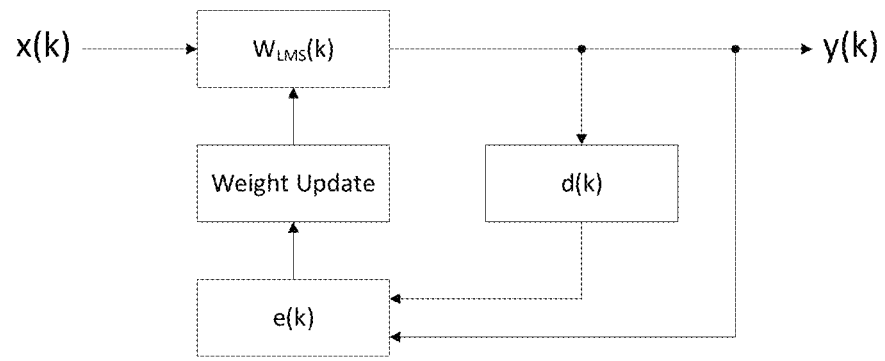
FIG. 3 depicts an example scheme where LMS adaptation is used for determining filter coefficients.

FIG. 3 depicts an example scheme where LMS adaptation is used for determining filter coefficients. The scheme can be used to determine a single or multiple tap coefficients, where w(k) represents weights (filter coefficients), described below. LMS attempts to minimize the cost function, by eliminating the correlation between decisions and an error signal. LMS process may be described in a vector form as follows:

$$\vec{w}(k+1)=\vec{w}(k)+\mu e^*(k)\cdot\vec{d}(k) \qquad \text{Equation 1}$$

where
  k=discrete time index,
  y(k) is the output of a filter (or controlled process),
  d(k) are decisions performed on the signal y(k),
  e(k)=d(k)−y(k) is the error, or residual between the output and the decisions, and
  w(k) is the current coefficient and w(k+1) is the updated coefficient for the next time step.

Equation 1 shows an example of a manner to update coefficients or weights of the filter, based on the error and decisions. If left to evolve, the weights will be driven in a manner that minimizes the cost function $J(k)=\langle\|e(k)\|^2\rangle$ (least mean square error).

Some known solutions can achieve tracking a fixed distance (offset) from the actual minimum by pausing or stopping the LMS tracking scheme after it has converged and then shifting it to the desired offset. In order to leave error or shift/skew in a gain control loop, the loop has to first converge to minimal mean square error and then the loop is opened (e.g., pause or stop LMS tracking scheme) and skew is applied. However, if the LMS tracking loop is activated again, the offset is eliminated as the loop tries to minimize the error again. The downside of stopping the tracking loops is that it stops tracking the system parameter and if there is a shift in minimum error or shift in noise or the tracked parameter, they are not compensated for. In some solutions, the LMS tracking scheme can remove a system or parameter response to noise and stopping the scheme prevents this removal of a system or parameter response to noise. In other words, opening the feedback loop can stop the tracking against transient noise phenomena and against changes in the channel, ISI or circuit parameters that effect the LMS coefficient, thermal noise, and voltage transition noise. The desired behavior could be to continue tracking these variations and noise while maintaining the desired skew from optimal (in the sense of minimum error) value.

Figure 4:
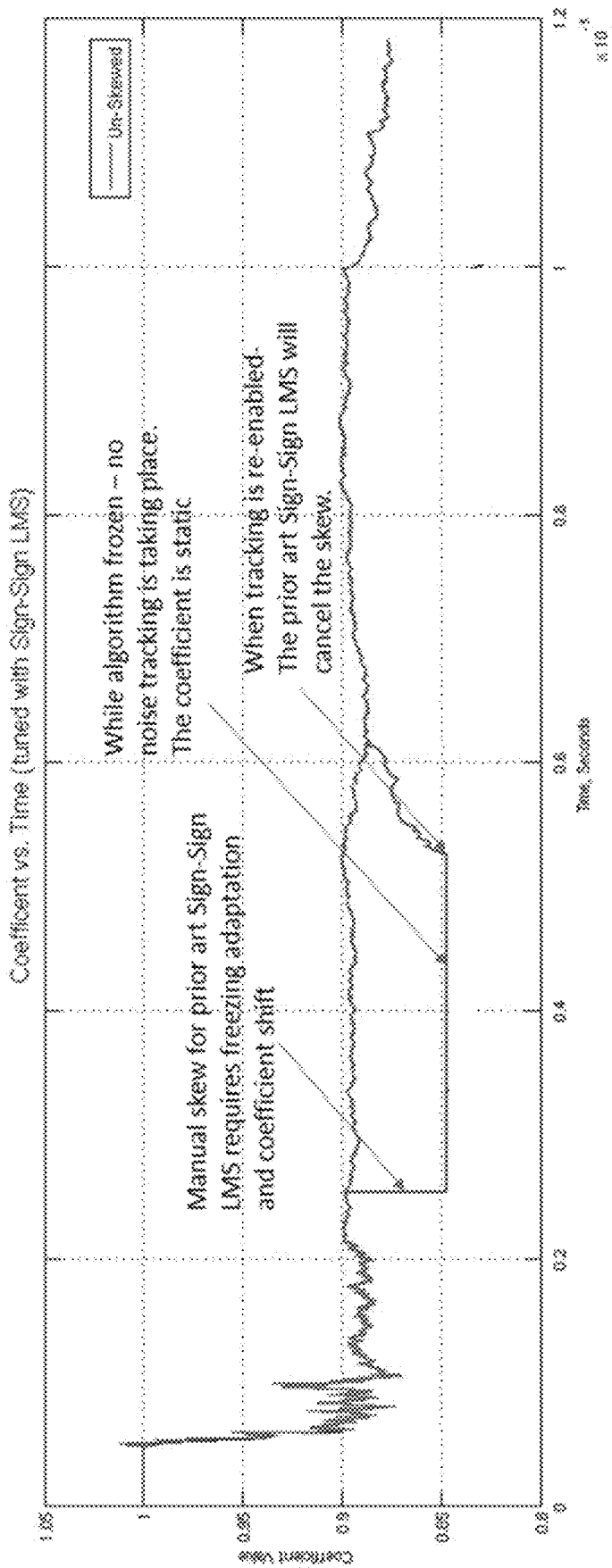
FIG. 4 depicts an example of how some solutions are not able to track a fixed distance offset from a minimum.

For example, FIG. 4 depicts an example of how some solutions are not able to track a fixed distance offset from a minimum. When tracking is re-enabled, the LMS will cancel the fixed distance offset (skew) and drift back to providing a coefficient that minimizes error, which can lead to elimination of the desired effect from skewing the LMS parameter.

DFE and other equalizers may impact error multiplication and the performance of error correction schemes in a system if their coefficients are too high or do not follow a certain profile. This has been shown in various scenarios defined by IEEE 802.3 (Ethernet), Optical Internetworking Forum (OIF)-Common Electrical (I/O) (OIF-CEI) and other standards. In order to force the coefficients below a certain envelop, various embodiments described herein can be employed, and skew tracking can be maintained. In order to skew the DFE to a non-minimum cost value, in some system, the loop is broken (opened) and then it stops tracking noise or variability in the system. If the loop is closed again (e.g., let it re-adapt, continue adapting, or restarting LMS tracking), in order to improve the parameter value, there may be an abrupt change in the parameter value which can create a glitch in the system which may cause detection errors. For example, a DFE coefficient's change may change CDR sampling point, which affects other system parameters and the global optimization sought will be lost since the DFE will drift back to the minimum mean square error result.

Various embodiments provide for adjusting an LMS scheme to lock to a non-zero coefficient offset from a minimum cost value without pausing or stopping LMS tracking. Various embodiments provide for modifying a correction part (e.g., e(k)) of the Equation 1 so that more correction occurs in the direction of increase than in the direction of decrease (or vice versa). In other words, a controlled parameter can stabilize on a different value than it would when the corrections are balanced. The amount of correction difference between increase and decrease can affect how far from the minimum of the cost function (e.g., LMS) may eventually stabilize-to.

Various embodiments provide for a coefficient update that has the same gain $\mu$ in the direction where $\vec{w}$ (k) increments and where $\vec{w}$ (k) decrements. In order to skew LMS to cause the loop to stabilize at a point that is away from the minimum mean square error, different changes to weights can be used for increments than for decrements or vice versa (see Equation 3). Each element of the vector $\vec{w}$ (k) can be considered as shown in Equation 2.

$$w_i(k+1) = w_i(k) + \mu e(k) \cdot d_i(k)$$

In some embodiments, skew can be achieved by utilization of Equation 3:

$$w_i(k+1) = w_i(k) + \mu \begin{cases} \alpha |e(k) \cdot d_i(k)|; & e(k) \cdot d_i(k) > 0 \\ -(1-\alpha)|e(k) \cdot d_i(k)|; & e(k) \cdot d_i(k) < 0 \end{cases} \quad \text{Equation 3}$$

where $1 > \alpha \geq 0$ is a parameter controlling the amount of achieved skew.

Various embodiments can be applied to sign-error and sign-sign LMS algorithms, which are modifications of the original LMS scheme. For example, in a sign-sign algorithm, defined by Equation 4, a modification of Equation 4 is given in Equation 5.

$$w_i(k+1) = w_i(k) + \mu \cdot \text{sign}(e(k)) \cdot \text{sign}(d_i(k)) \quad \text{Equation 4}$$

$$w_i(k+1) = w_i(k) + \mu \begin{cases} \alpha; & \text{sign}(e(k)) \cdot \text{sign}(d_i(k)) > 0 \\ -(1-\alpha); & \text{sign}(e(k)) \cdot \text{sign}(d_i(k)) < 0 \end{cases} \quad \text{Equation 5}$$

where $1 > \alpha > 0$
and sign(x)=1 if x>=0 and −1 if x<0.

Figure 5:
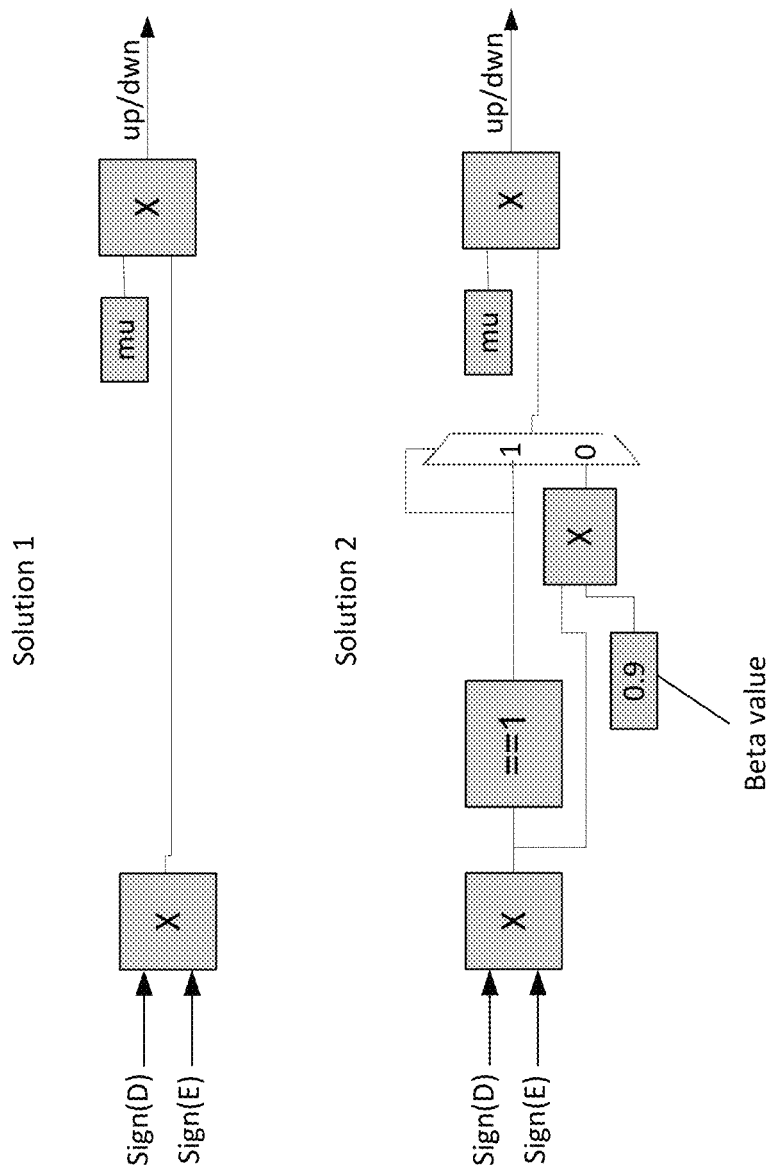
FIG. 5 shows a logical representation of an error calculation.

According to some embodiments, an expression that may be used that achieves the same impact on the LMS final result is given (in sign-sign LMS form) in Equation and in FIG. 5.

$$w_i(k+1) = w_i(k) + \mu \begin{cases} 1; & \text{sign}(e(k)) \cdot \text{sign}(d_i(k)) > 0 \\ -\beta; & \text{sign}(e(k)) \cdot \text{sign}(d_i(k)) < 0 \end{cases} \quad \text{Equation 6}$$

This expression can define a relationship between two choices, where $|1-\beta|$ is a desired skew. The desired skew is set by controlling $\beta$ or $\alpha$ in the equations above, until the global optimization goal (e.g., overall maxima in SNR or minima in system noise, etc.) is achieved. In some cases, $2 > \beta > 0$ selection can impact the rate of descent as well as a final result. Setting $1 > \beta > 0$ provides a negative skew and $2 > \beta > 1$ provides a positive skew and when $\beta = 1$, skew will be 0. Accordingly, skew can be adjusted, in this example between −1 and 1.

FIG. 5 shows a logical representation of a solution where LMS calculates a lowest error (Solution 1) and a control scheme in accordance with some embodiments to modify LMS calculation to not determine a lowest error (Solution 2) but an offset from a lowest error. Solution 2 represents Equation 6, in some examples. In this example, Beta value ($\beta$)=0.9 but any valid value of $\beta > 0$ can be used. Up/dwn=1 indicates a coefficient of a tap is to be increased whereas Up/dwn=0 indicates a coefficient of a tap is to be decreased.

Figure 6:
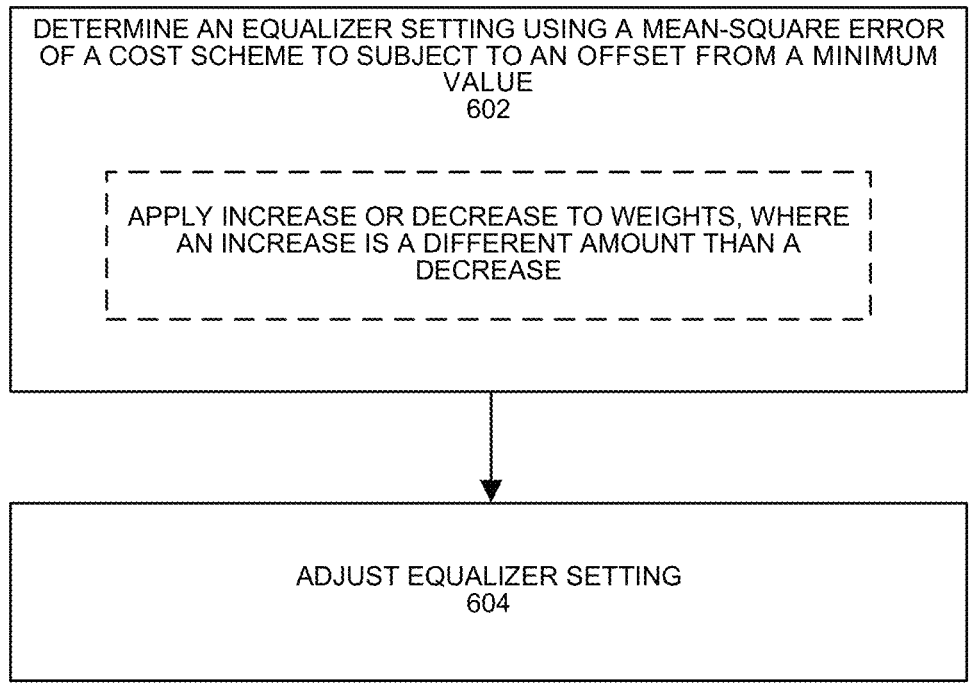
FIG. 6 shows an example process that can be used to set a tap coefficient of an equalizer.

FIG. 6 shows an example process that can be used to set a tap coefficient of an equalizer. At 602, an equalizer setting is determined using a mean-square error of a cost scheme subject to an offset from a minimum cost value. For example, an equalizer can be any of: continuous time linear equalizer (CTLE), decision feedback equalizers (DFE), or feed forward equalizers (FFE). The offset from the minimum value can be set based on a skew in Equation 6. In some examples, in order to skew mean-square error of a cost scheme to a desired non-minimum cost value, different weights can be used for increments than for decrements of a weight value (or vice versa). In other words, in some examples, a weight value increment step can be larger than a weight value decrement step, or weight value decrement step can be larger than a weight value increment step.

At 604, the determined equalizer setting can be applied to an equalizer tap. For example, the equalizer setting can be increased or decreased by an increment determined in 602.

Note that the process of FIG. 6 can be applied to determine a gain tap setting. Automatic gain control (AGC) can be the automatic gain tap control loop in the system and can be tuned by LMS as well, for instance if i=0 in equation 4 then the LMS tap coefficient becomes the system gain coefficient or the AGC.

Figure 7:
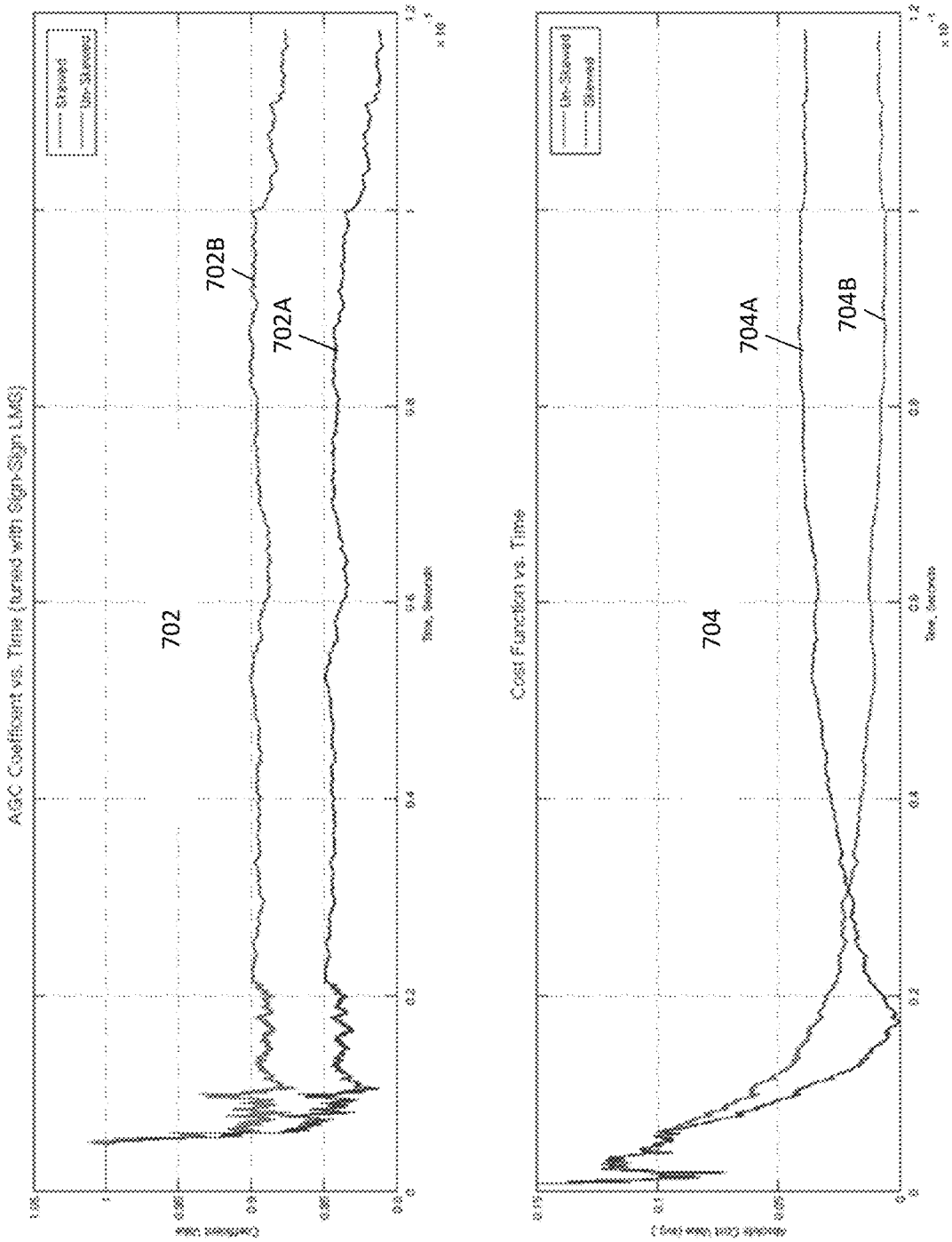
FIG. 7 shows a convergence example with a descent of an automatic gain control (AGC) when adapted with sign-sign LMS and using skew according to various embodiments.

FIG. 7 shows a convergence example with a descent of an AGC when adapted with sign-sign LMS and using skew according to various embodiments. For reference, an un-skewed sign-sign LMS convergence graph is shown as 702B and the skewed graph is shown as 702A. Note that in the un-skewed version (702B), the AGC coefficient converges to −0.9, while for the skewed version (702A), the convergence is to a final version of −0.85 (desired skew of 0.05). After convergence both loops are active, tap coefficient values are adjusted by reacting to noise and drift or other factors (e.g., device, channel or voltage or temperature variability). Graph 704 shows a skewed mean square error cost value (704A) converging to approximately 0.05 (as desired) and an unskewed mean square error cost value (704B) converging to approximately 0.00.

Figure 8:
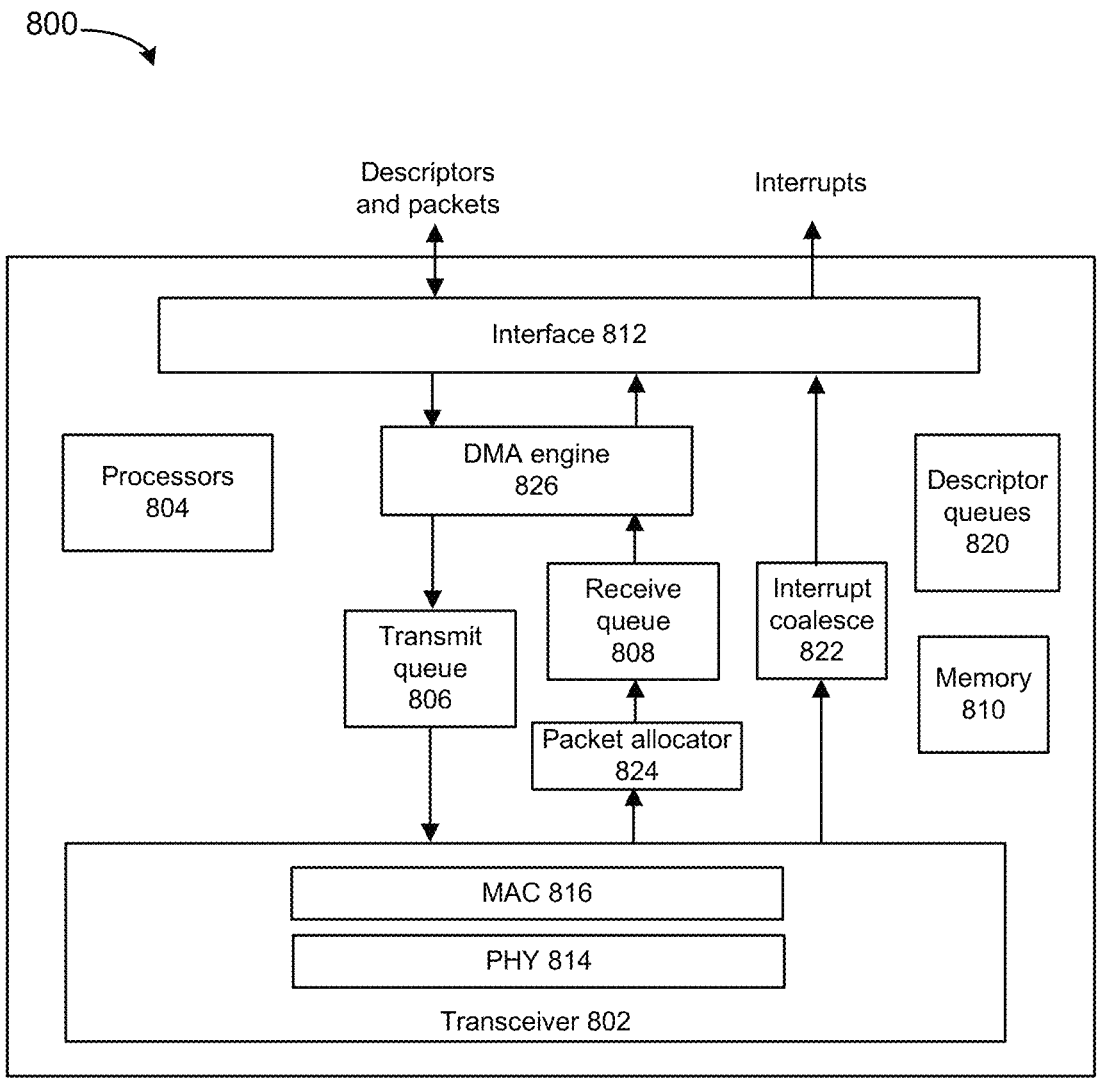
FIG. 8 depicts a network interface that can use embodiments or be used by embodiments.

FIG. 8 depicts a network interface that can use embodiments or be used by embodiments. In some embodiments, network interface an include capability to apply a skewed offset scheme can be used whereby an LMS cost operation is used to select equalizer settings using an offset from a local minimum value in accordance with embodiments described herein. In some examples, network interface 800 can be implemented as a network interface controller, network interface card, a host fabric interface (HFI), or host bus adapter (HBA), and such examples can be interchangeable. Network interface 800 can be coupled to one or more servers using a bus, PCIe, CXL, or DDR. Network interface 800 may be embodied as part of a system-on-a-chip (SoC) that includes one or more processors, or included on a multichip package that also contains one or more processors.

Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to perform MAC address filtering on received packets, process MAC headers of received packets by verifying data integrity, remove preambles and padding, and provide packet content for processing by higher layers. MAC circuitry 816 can be configured to assemble data to be transmitted into packets, that include destination and source addresses along with network control information and error detection hash values.

Processors 804 can be any a combination of a: processor, core, graphics processing unit (GPU), field programmable gate array (FPGA), application specific integrated circuit (ASIC), or other programmable hardware device that allow programming of network interface 800. For example, a "smart network interface" or SmartNIC can provide packet processing capabilities in the network interface using processors 804. In some examples, processors 804 can be implemented as a processor component for a SmartNIC.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808 and corresponding destination memory regions. Bus interface 812 can provide an interface with host device (not depicted). For example, bus interface 812 can be compatible with PCI, PCI Express, PCI-x, Serial ATA, and/or USB compatible interface (although other interconnection standards may be used).

Figure 9:
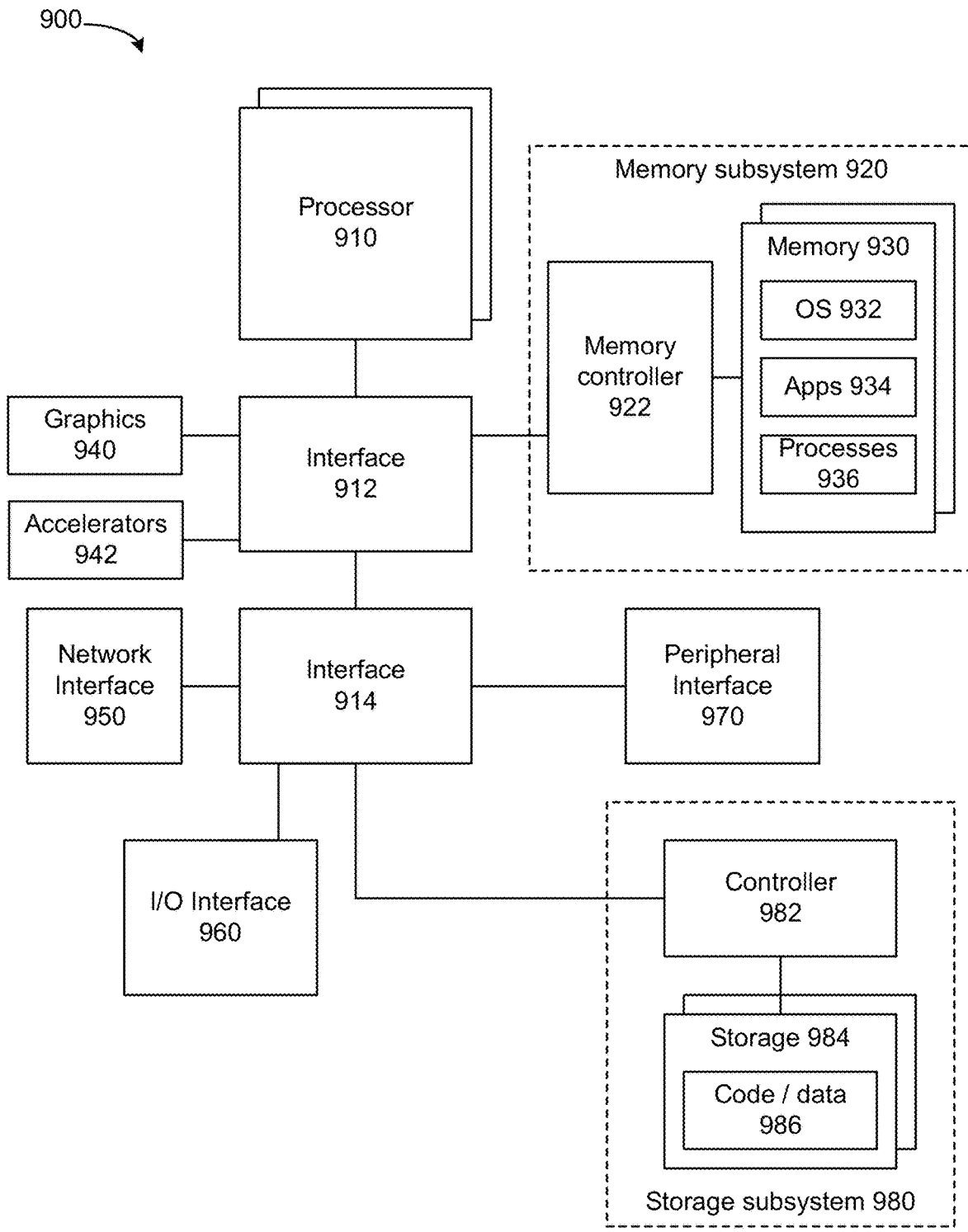
FIG. 9 depicts a system.

FIG. 9 depicts a system. The system can use embodiments described herein to apply a skewed offset scheme can be used whereby an LMS cost operation is used to select equalizer settings using an offset from a local minimum value. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920, graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a programmable or fixed function offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

In some examples, OS 932 can determine a capability of a device associated with a device driver. For example, OS 932 can receive an indication of a capability of a device (e.g., NIC 950 or a storage configuration interface) to apply a skewed offset scheme can be used whereby an LMS cost operation is used to select equalizer settings using an offset from a local minimum value. OS 932 can request a driver to enable or disable NIC 950 to perform any of the capabilities described herein. In some examples, OS 932, itself, can enable or disable NIC 950 to perform any of the capabilities described herein. OS 932 can provide requests (e.g., from an application or VM) to NIC 950 to utilize one or more capabilities of NIC 950. For example, any application can request use or non-use of any of capabilities described herein by NIC 950.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 900 includes interface 914, which can be coupled to interface 912. In one example, interface 914 represents an interface circuit, which can include stand-alone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, Infinity Fabric (IF), and successors or variations thereof.

Figure 10:
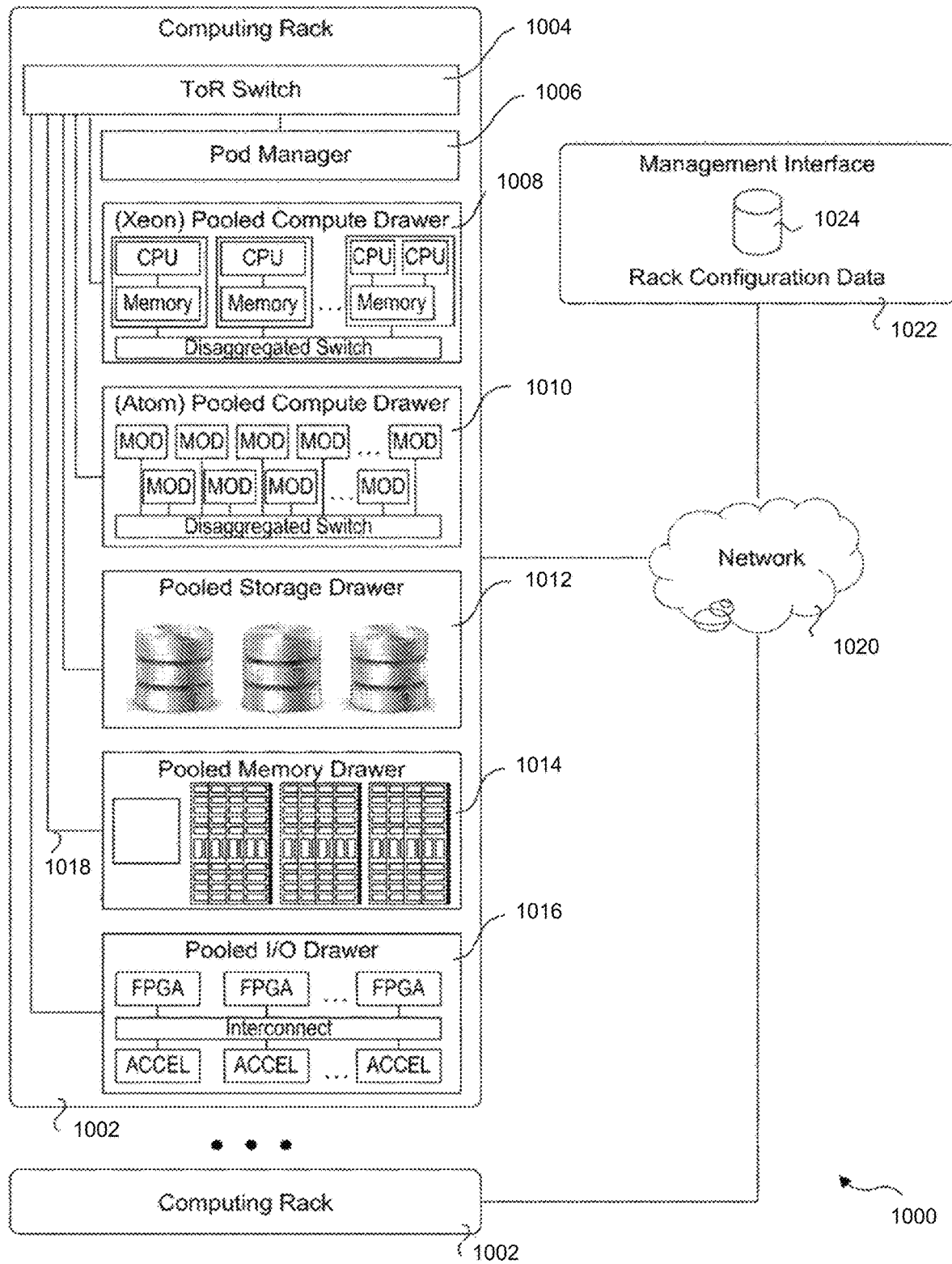
FIG. 10 depicts an environment.

FIG. 10 depicts an environment 1000 that includes multiple computing racks 1002, each including a Top of Rack (ToR) switch 1004, a pod manager 1006, and a plurality of pooled system drawers. Embodiments of the switch herein can utilize coefficient setting techniques described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1008, and Intel® ATOM™ pooled compute drawer 1010, a pooled storage drawer 1012, a pooled memory drawer 1014, and a pooled I/O drawer 1016. Each of the pooled system drawers is connected to ToR switch 1004 via a high-speed link 1018, such as an Ethernet link or a Silicon Photonics (SiPh) optical link.

Multiple of the computing racks 1002 may be interconnected via their ToR switches 1004 (e.g., to a pod-level switch or data center switch), as illustrated by connections to a network 1020. In some embodiments, groups of computing racks 1002 are managed as separate pods via pod manager(s) 1006. In one embodiment, a single pod manager is used to manage all of the racks in the pod. Alternatively, distributed pod managers may be used for pod management operations.

Environment 1000 further includes a management interface 1022 that is used to manage various aspects of the environment. This includes managing rack configuration, with corresponding parameters stored as rack configuration data 1024.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Example 1 can include a method for setting an equalizer tap setting and gain setting in a serializer/deserializer (SerDes), the method comprising: determining an equalizer setting and gain setting by causing a mean-square error cost scheme tracking to lock to an offset from a minimum of a cost of the mean-square error cost scheme without pausing error cost tracking.

Example 2 includes any example, wherein the mean-square error cost scheme comprises a least mean square (LMS) scheme.

Example 3 includes any example, wherein determining an equalizer setting comprises: applying increases or decreases to an equalizer setting, wherein an amount of increase to an equalizer setting is different than an amount of decrease to an equalizer setting.

Example 4 includes any example, wherein determining an equalizer setting comprises determining:

$$w_i(k+1) = w_i(k) + \mu \begin{cases} 1; & \text{sign}(e(k)) \cdot \text{sign}(d_i(k)) > 0 \\ -\beta; & \text{sign}(e(k)) \cdot \text{sign}(d_i(k)) < 0 \end{cases}$$

where $|1-\beta|$ comprises a value of the offset.

Example 5 includes any example, wherein determining an equalizer setting comprises determining:

$$w_i(k+1) = w_i(k) + \mu \begin{cases} \alpha; & \text{sign}(e(k)) \cdot \text{sign}(d_i(k)) > 0 \\ -(1-\alpha); & \text{sign}(e(k)) \cdot \text{sign}(d_i(k)) < 0 \end{cases}$$

where $1 > \alpha > 0$.

Example 6 includes any example, and includes setting a tap setting of an equalizer based on the determined equalizer setting.

Example 7 includes any example, and includes allowing presence of error in an output of the mean-square error cost scheme to configure multiple equalizers, wherein the multiple equalizers track inter-symbol interference (ISI).

Example 8 includes any example, wherein the equalizer comprises one or more of: variable gain amplifier (VGA), continuous time linear equalizer (CTLE), decision feedback equalizer (DFE), or feed forward equalizer (FFE).

Example 9 includes any example, wherein the SerDes is in a receiver or transmitter of a communication device and the SerDes is part of a physical layer interface.

Example 10 includes any example, wherein the physical layer interface is consistent with Ethernet, FibreChannel, InfiniBand, or Serial Attached Small Computer System Interface (SAS).

Example 11 includes any example, and includes an apparatus that includes: a serializer/deserializer (SerDes) comprising at least one equalizer and a controller to determine at least one coefficient of an equalizer, the controller to determine an equalizer setting by utilization of a mean-square error cost scheme subject to an offset and maintain the offset by application of an increase or decrease to an equalizer setting, wherein the increase to an equalizer setting is different than the decrease to an equalizer setting.

Example 12 includes any example, wherein the mean-square error cost scheme comprises a least mean square (LMS) scheme.

Example 13 includes any example, wherein to determine an equalizer setting by utilization of a mean-square error cost scheme subject to an offset and maintain the offset, the controller is to determine:

$$w_i(k+1) = w_i(k) + \mu \begin{cases} 1; & \text{sign}(e(k)) \cdot \text{sign}(d_i(k)) > 0 \\ -\beta; & \text{sign}(e(k)) \cdot \text{sign}(d_i(k)) < 0 \end{cases}$$

where $|1-\beta|$ comprises a value of the offset.

Example 14 includes any example, wherein to determine an equalizer setting by utilization of a mean-square error cost scheme subject to an offset and maintain the offset, the controller is to determine:

$$w_i(k+1) = w_i(k) + \mu \begin{cases} \alpha; & \text{sign}(e(k)) \cdot \text{sign}(d_i(k)) > 0 \\ -(1-\alpha); & \text{sign}(e(k)) \cdot \text{sign}(d_i(k)) < 0 \end{cases}$$

where $1 > \alpha > 0$.

Example 15 includes any example, wherein the controller is to: set a tap setting of the equalizer based on the determined equalizer setting.

Example 16 includes any example, wherein the controller is to: allow a presence of error in an output of the mean-square error cost scheme to configure multiple equalizers, wherein the multiple equalizers track inter-symbol interference (ISI).

Example 17 includes any example, wherein the equalizer comprises one or more of: variable gain amplifier (VGA), continuous time linear equalizer (CTLE), decision feedback equalizer (DFE), or feed forward equalizer (FFE).

Example 18 includes any example, comprising a network interface coupled to one or more of a server, rack, or data center, wherein the server is to utilize the controller for link training and wherein the server, rack, or data center is to receive or transmit signals using the network interface configured with the equalizer setting.

Example 19 includes any example, and includes a computer-readable medium comprising, instructions stored thereon, that if executed by a processor, cause the processor to: configure a controller of a serializer/de-serializer (SerDes) device to determine at least one coefficient of an equalizer by utilization of a mean-square error cost scheme subject to an offset and maintain the offset without pausing of the mean-square error cost scheme by use of unequal increases and decreases to coefficient values.

Example 20 includes any example, wherein the mean-square error cost scheme comprises a least mean square (LMS) scheme.

Example 21 includes any example, wherein the equalizer comprises one or more of: variable gain amplifier (VGA), continuous time linear equalizer (CTLE), decision feedback equalizer (DFE), or feed forward equalizer (FFE).

What is claimed is:

1. A method for setting an equalizer tap setting and gain setting in a serializer/deserializer (SerDes), the method comprising:
    determining an equalizer setting and gain setting by causing a mean-square error cost scheme tracking to lock to an offset from a minimum of a cost of the mean-square error cost scheme without pausing error cost tracking, wherein the determining the equalizer setting is based on a previous equalizer setting adjusted by a value based on sign values of error signal and data decisions, wherein the determining the equalizer setting comprises setting the equalizer setting to an achieved skew level or a negative of a target skew level, and wherein:
    in a first configuration, the determining the equalizer setting comprises determining:

$w_i(k+1) = w_i(k) + \mu\{1; \text{sign}(e(k)) \cdot \text{sign}(d_i(k)) > 0$ $\mu\{-\beta; \text{sign}(e(k)) \cdot \text{sign}(d_i(k)) < 0,$ where $|1-\beta|$ comprises a value of the offset and
    in a second configuration, the determining the equalizer setting comprises determining:

$w_i(k+1) = w_i(k) + \mu\{\alpha; \text{sign}(e(k)) \cdot \text{sign}(d_i(k)) > 0$ $\mu\{-(1-\alpha); \text{sign}(e(k)) \cdot \text{sign}(d_i(k)) < 0,$ where $1 > \alpha > 0$.

2. The method of claim 1, wherein the mean-square error cost scheme comprises a least mean square (LMS) scheme.

3. The method of claim 1, wherein determining an equalizer setting comprises:
    applying increases or decreases to an equalizer setting, wherein an amount of increase to an equalizer setting is different than an amount of decrease to an equalizer setting.

4. The method of claim 1, comprising:
setting a tap setting of an equalizer based on the determined equalizer setting.

5. The method of claim 1, comprising:
allowing presence of error in an output of the mean-square error cost scheme to configure multiple equalizers, wherein the multiple equalizers track inter-symbol interference (ISI).

6. The method of claim 1, wherein the equalizer comprises one or more of: variable gain amplifier (VGA), continuous time linear equalizer (CTLE), decision feedback equalizer (DFE), or feed forward equalizer (FFE).

7. The method of claim 1, wherein the SerDes is in a receiver or transmitter of a communication device and the SerDes is part of a physical layer interface.

8. The method of claim 7, wherein the physical layer interface is consistent with Ethernet, FibreChannel, InfiniBand, or Serial Attached Small Computer System Interface (SAS).

9. An apparatus comprising:
a serializer/deserializer (SerDes) comprising at least one equalizer; and
a controller to determine at least one coefficient of an equalizer of the at least one equalizer, the controller to determine an equalizer setting by utilization of a mean-square error cost scheme subject to an offset and maintain the offset by application of an increase or decrease to an equalizer setting, wherein the determine the equalizer setting is based on a previous equalizer setting adjusted by a value based on sign values of error signal and data decisions, wherein the determining the equalizer setting comprises setting the equalizer setting to an achieved skew level or a negative of a target skew level, and wherein:
in a first configuration, to determine the equalizer setting, the controller is to determine:

$w_i(k+1)=w_i(k)+\mu\{1; \operatorname{sign}(e(k))\cdot\operatorname{sign}(d_i(k))>0$ $\mu\{-\beta; \operatorname{sign}(e(k))\cdot\operatorname{sign}(d_i(k))<0,$ where $|1-\beta|$ comprises a value of the offset and
in a second configuration, to determine the equalizer setting, the controller is to determine:

$w_i(k+1)=w_j(k)+\mu\{\alpha; \operatorname{sign}(e(k))\cdot\operatorname{sign}(d_i(k))>0$ $\mu\{-(1-\alpha); \operatorname{sign}(e(k))\cdot\operatorname{sign}(d_i(k))<0,$ where $1>\alpha>0$.

10. The apparatus of claim 9, wherein the mean-square error cost scheme comprises a least mean square (LMS) scheme.

11. The apparatus of claim 9, wherein the controller is to:
set a tap setting of the equalizer of the at least one equalizer based on the determined equalizer setting.

12. The apparatus of claim 9, wherein the controller is to:
allow a presence of error in an output of the mean-square error cost scheme to configure multiple equalizers of the at least one equalizer, wherein the multiple equalizers track inter-symbol interference (ISI).

13. The apparatus of claim 9, wherein the equalizer of the at least one equalizer comprises one or more of: variable gain amplifier (VGA), continuous time linear equalizer (CTLE), decision feedback equalizer (DFE), or feed forward equalizer (FFE).

14. The apparatus of claim 9, comprising a network interface coupled to one or more of a server, rack, or data center, wherein the server is to utilize the controller for link training and wherein the server, rack, or data center is to receive or transmit signals by the network interface configured with the equalizer setting.

15. A non-transitory computer-readable medium comprising, instructions stored thereon, that if executed by a processor, cause the processor to:
configure a controller of a serializer/de-serializer (SerDes) device to determine at least one coefficient of an equalizer by utilization of a mean-square error cost scheme subject to an offset and maintain the offset without pausing of the mean-square error cost scheme by use of unequal increases and decreases to coefficient values, wherein the determine at least one coefficient of the equalizer is based on a previous equalizer setting adjusted by a value based on sign values of error signal and data decisions, wherein the determining the equalizer setting comprises setting the equalizer setting to an achieved skew level or a negative of a target skew level, and wherein:
in a first configuration, to determine the at least one coefficient of the equalizer, the controller is to determine:

$w_i(k+1)=w_i(k)+\mu\{1; \operatorname{sign}(e(k))\cdot\operatorname{sign}(d_i(k))>0$ $\mu\{-\beta; \operatorname{sign}(e(k))\cdot\operatorname{sign}(d_i(k))<0,$ $\mu\{-\beta; \operatorname{sign}(e(k))\cdot\operatorname{sign}(d_i(k))<0,$ where $|1-\beta|$ comprises a value of the offset and
in a second configuration, to determine the at least one coefficient of the equalizer, the controller is to determine:

$w_i(k+1)=w_j(k)+\mu\{\alpha; \operatorname{sign}(e(k))\cdot\operatorname{sign}(d_i(k))>0$ $\mu\{-(1-\alpha); \operatorname{sign}(e(k))\cdot\operatorname{sign}(d_i(k))<0,$ where $1>\alpha>0$.

16. The non-transitory computer-readable medium of claim 15, wherein the mean-square error cost scheme comprises a least mean square (LMS) scheme.

17. The non-transitory computer-readable medium of claim 15, wherein the equalizer comprises one or more of: variable gain amplifier (VGA), continuous time linear equalizer (CTLE), decision feedback equalizer (DFE), or feed forward equalizer (FFE).

* * * * *

UNITED STATES PATENT AND TRADEMARK OFFICE
CERTIFICATE OF CORRECTION

| | | |
|---|---|---|
| PATENT NO. | : 11,991,025 B2 | |
| APPLICATION NO. | : 17/110228 | |
| DATED | : May 21, 2024 | |
| INVENTOR(S) | : Itamar Levin and Tali Warshavsky | |

It is certified that error appears in the above-identified patent and that said Letters Patent is hereby corrected as shown below:

In the Claims

Column 22, Line 14, Claim 15, should read as follows:
15: A non-transitory computer-readable medium comprising, instructions stored thereon, that if executed by a processor, cause the processor to:
    configure a controller of a serializer/de-serializer (SerDes) device to determine at least one coefficient of an equalizer by utilization of a mean-square error cost scheme subject to an offset and maintain the offset without pausing of the mean-square error cost scheme by use of unequal increases and decreases to coefficient values, wherein the determine at least one coefficient of the equalizer is based on a previous equalizer setting adjusted by a value based on sign values of error signal and data decisions, wherein the determining the equalizer setting comprises setting the equalizer setting to an achieved skew level or a negative of a target skew level, and wherein: in a first configuration, to determine the at least one coefficient of the equalizer, the controller is to determine:
    $wi(k+1) = wi(k) + \mu\{1; sign(e(k)) \cdot sign(di(k)) > 0$
        $\mu \{-\beta; sign(e(k)) \cdot sign(di(k)) < 0,$
where $|1-\beta|$ comprises a value of the offset and
    in a second configuration, to determine the at least one coefficient of the equalizer, the controller is to determine:
    $wi(k+1) = wi(k) + \mu\{\alpha; sign(e(k)) \cdot sign(di(k)) > 0$
        $\mu \{-(1-\alpha); sign(e(k)) \cdot sign(di(k)) < 0,$
where $1 > \alpha > 0$.

Signed and Sealed this
Sixteenth Day of July, 2024

Katherine Kelly Vidal
*Director of the United States Patent and Trademark Office*